(12) United States Patent
Hoffmann

(10) Patent No.: US 11,209,293 B2
(45) Date of Patent: Dec. 28, 2021

(54) SENSOR HOUSING AND SENSOR

(71) Applicant: Balluff GmbH, Neuhausen (DE)

(72) Inventor: Laszlo Hoffmann, Weinheim (DE)

(73) Assignee: BALLUFF GMBH, Neuhasen (DE)

( * ) Notice: Subject to any disclaimer, the term of this patent is extended or adjusted under 35 U.S.C. 154(b) by 81 days.

(21) Appl. No.: 16/684,665

(22) Filed: Nov. 15, 2019

(65) Prior Publication Data
US 2020/0166386 A1 May 28, 2020

(30) Foreign Application Priority Data
Nov. 22, 2018 (DE) .......................... 102018129497.2

(51) Int. Cl.
*G01D 11/30* (2006.01)
*G01D 11/24* (2006.01)
*G01D 11/16* (2006.01)

(52) U.S. Cl.
CPC ............ *G01D 11/245* (2013.01); *G01D 11/30* (2013.01); *G01D 11/16* (2013.01)

(58) Field of Classification Search
CPC ................................ G01D 11/30; G01D 11/16
See application file for complete search history.

(56) References Cited

U.S. PATENT DOCUMENTS

| 7,134,315 | B1 * | 11/2006 | Stigler | ................... | G01F 23/284 |
| | | | | | 73/290 V |
| 9,249,909 | B2 * | 2/2016 | Ikushima | ................ | F16K 27/02 |
| 10,107,700 | B2 * | 10/2018 | Hedtke | ................... | F16J 15/064 |
| 2012/0074694 | A1 * | 3/2012 | Butte | ....................... | F16L 23/22 |
| | | | | | 285/336 |
| 2013/0321002 | A1 * | 12/2013 | Elliott | ....................... | G01R 3/00 |
| | | | | | 324/662 |
| 2014/0353927 | A1 * | 12/2014 | Schroder | ................. | F16L 23/22 |
| | | | | | 277/626 |

FOREIGN PATENT DOCUMENTS

| CN | 101874202 A | 10/2010 |
| CN | 102759553 A | 10/2012 |
| CN | 1840348 A | 10/2016 |
| CN | 106017609 A | 10/2016 |
| DE | 102006012115 A1 | 3/2007 |

OTHER PUBLICATIONS

The People's Republic of China, First Office Action; dated Mar. 3, 2021; Issuance No. 2021022602161460; Application or Patent No. 201911159225.0; pp. 1-9.

* cited by examiner

*Primary Examiner* — Jamel E Williams
(74) *Attorney, Agent, or Firm* — Taft Stettinius & Hollister LLP; Ryan O. White; Derek B. Lavender

(57) ABSTRACT

The invention relates to a sensor housing, which has a base body (10) and a media contacting cap (20). The media contacting cap (20) is arranged partially in a recess (11) of the base body (10) in a detachable manner. It has an annularly running recess (21) for partially receiving a sealing element (60) for a metal clamp connection. Furthermore, the invention relates to a sensor. This has a measuring element (30), which is arranged in the media contacting cap (20) of the sensor housing.

10 Claims, 4 Drawing Sheets

SENSOR HOUSING AND SENSOR

The present invention relates to a sensor housing. Furthermore, it relates to a sensor which has the sensor housing.

PRIOR ART

Capacitive fill level sensors in the field of medical technology and the food industry, such as process sensors, in particular, which come into contact with pharmaceutical products or with food, have to conform to certain requirements in terms of process control and suitable hygienic design. A suitable selection of hygienic materials, a surface roughness suitable for the application, the shaping and the construction of the components, as well as the gap-free design of components touching the product, are intended to foster a hygienic process control and facilitate the cleaning and sterilisation of the sensors in order to thus preclude the risk of contaminating the product. These requirements are indirectly formulated in EC regulation No. 1935/2004.

DE 10 2006 012 115 A1 proposes a sterilisable disposable insert for a measuring instrument. This consists of an elastomeric material and, in connection with a disposable container insert, serves to cover the inside of a container. A measuring probe for the measuring instrument is introduced into the disposable insert. The shape of the disposable insert matches the outer contours of the measuring probe and a process attachment for installing the measuring probe on a counter attachment on the container.

One object of the present invention is to provide a sensor housing which enables a hygienic protection of a sensor from a product and which is reusable many times in an environmentally friendly manner. To do so, it shall be able to be cleaned and disinfected in a CIP/SIP process (Clean in Place/Sterilization in Place) in the closed process and is also able to withstand sterilisation in an autoclave. A further object of the invention is to provide a sensor which has such a sensor housing.

DISCLOSURE OF THE INVENTION

This object is solved by a sensor housing which has a base body and a media contacting cap. A media contacting cap is here to be understood as a cap which can come into contact with solid, liquid or gaseous media, which have to be handled in a suitably hygienic manner. The media contacting cap is arranged partially yet not fully in a recess of the base body. This arrangement is detachable, such that the media contacting cap can be detached for the purpose of cleaning and disinfecting the base body and can then be reattached to it. The media contacting cap has a recess running in a circle on it which serves to partially receive a sealing element for a metal clamp.

Metal clamp connections which satisfy the standards ISO 2852 and/or DIN 32676 are considered to be suitably hygienic and capable of CIP/SIP. They are commercially available under the brand name Triclamp®, for example. They enable the attachment of a sensor housing to a container by means of a welding flange on the container side, a sealing surface of the sealing element on the sensor side and a fastening clamp. In the sensor housing according to the invention, the media contacting cap serves not only to separate a measuring element of a sensor positioned in it from a medium, but it simultaneously also functions as a sealing surface on the sensor side. In this way, an unhygienic transition touching the media between the housing and the media contacting cap in a region of the sensor housing, which is in contact with the media, is avoided. Instead, the medium exclusively touches the gap-free surface of the media contacting cap.

While the base body can consist of a metal or a metal alloy, it is preferred that the media contacting cap consists of at least one plastic. This enables the use of the sensor housing for capacitive sensors as well, for which a detection through metal walls is, in principle, not possible.

The plastic is preferably polytetrafluoroethylene (PTFE) or polyether ether ketone (PEEK). This plastic is resistant to high thermal loads of up to 150° C. and to high pressure loads of up to 6 bar when being cleaned and disinfected in an autoclave. Moreover, it is chemically resistant to alkaline and acidic detergents.

The media contacting cap preferably has a discoid section and at least one hollow-cylindrical section. Here, the discoid section is arranged in the recess of the base body. Particularly preferably, it is arranged fully in this recess in order to enable a smooth locking of the media contacting cap to the base body. The peripheral recess is arranged in the discoid section. While the discoid section thus functions as a sealing surface, the hollow-cylindrical section can receive the measuring element of a sensor. It can also be provided that several hollow-cylindrical sections are arranged one behind the other in tiers, for example. The discoid section is pierced through in such a way that the cavity of the hollow-cylindrical section or the hollow-cylindrical sections also extends through the discoid section and, in this way, can be connected to a cavity in the base body.

Furthermore, the sensor housing preferably has a sealing element for a metal clamp, which has an engagement region, for example, in the form of an enlargement. The engagement region engages into the recess of the media contacting cap, such that the sealing element is positioned exactly in relation to the media contacting cap. In this way, the sealing element is prevented from slipping, which could lead to a lack of tightness of the metal clamp connection.

Furthermore, the sensor housing preferably has a welding flange. Such a welding flange, which can also be referred to as a welding support, serves to connect the sensor housing to a media container. Just like the media contacting cap, the welding flange also has a recess running in a circle on it. The engagement region of the sealing element also engages into the recess of the welding flange, such that its position in relation to the sealing element and thus also in relation to the media contacting cap is also fixed.

In order to hygienically connect the media contacting cap and the welding flange to each other by means of a metal clamp connection, it is furthermore preferred that the sensor housing has a fastening clamp, which clamps the housing, the sealing element and the welding flange to one another. The fastening clamp preferably encloses the housing, the sealing element and the welding flange each at least partially.

Furthermore, it is preferred that the sealing element extends between the housing and the fastening clamp. This can be achieved, in particular, by the sealing element having an annular section, which abuts on the media contacting cap and which has an annular lip angled at a right angle in relation to the media contacting cap, said lip enclosing the housing. The first annular section here has the engagement region, and the second annular section comes to rest between the housing and the fastening clamp and thus prevents the inner peripheral surface of the fastening clamp pressing onto the housing. Thus, a metal abrasion which could lead to a tack of tightness in the long run is prevented.

The object is furthermore solved by a sensor. This sensor has the sensor housing according to the invention. A measuring element of the sensor is here arranged in the media contacting cap of the sensor housing. In this way, it can be brought into the proximity of a medium, yet it is here protected from it in a hygienic manner by the media contacting cap.

In principle, the measuring element can be used for a wide variety of sensor applications such as measuring the temperature, pressure, current speed or pH value of a medium, for example. The measuring element is nevertheless preferably a capacitive measuring element. Since capacitive measuring elements cannot be detected through metal walls, the advantage of the sensor housing according to the invention can here be used that the media contacting cap may consist of a different material from the base body and thus can be produced from a plastic.

If the sensor housing has a welding flange, then the sensor element is preferably located in a section of the media contacting cap which extends along the longitudinal axis of the sensor beyond the welding flange. In this way, the measuring element is prevented from being enclosed by the metal welding flange, which is also particularly advantageous for capacitive applications.

In order to ensure that the measuring element is not exposed to any damaging environmental influences when removing the media contacting cap for the purpose of cleaning and disinfection, it is preferred that the measuring element is furthermore enclosed by an insulation cap, which extends into the base body. The measuring element can then be arranged in the media contacting cap by it being introduced into it together with the insulation cap. The insulation cap preferably consists of a plastic, particularly preferably of polytetrafluoroethylene (PTFE) or of polyether ether ketone (PEEK).

BRIEF DESCRIPTION OF THE DRAWINGS

An exemplary embodiment of the invention is depicted in the drawings and is explained in more detail in the description below.

EXEMPLARY EMBODIMENTS OF THE INVENTION

Figure 1:
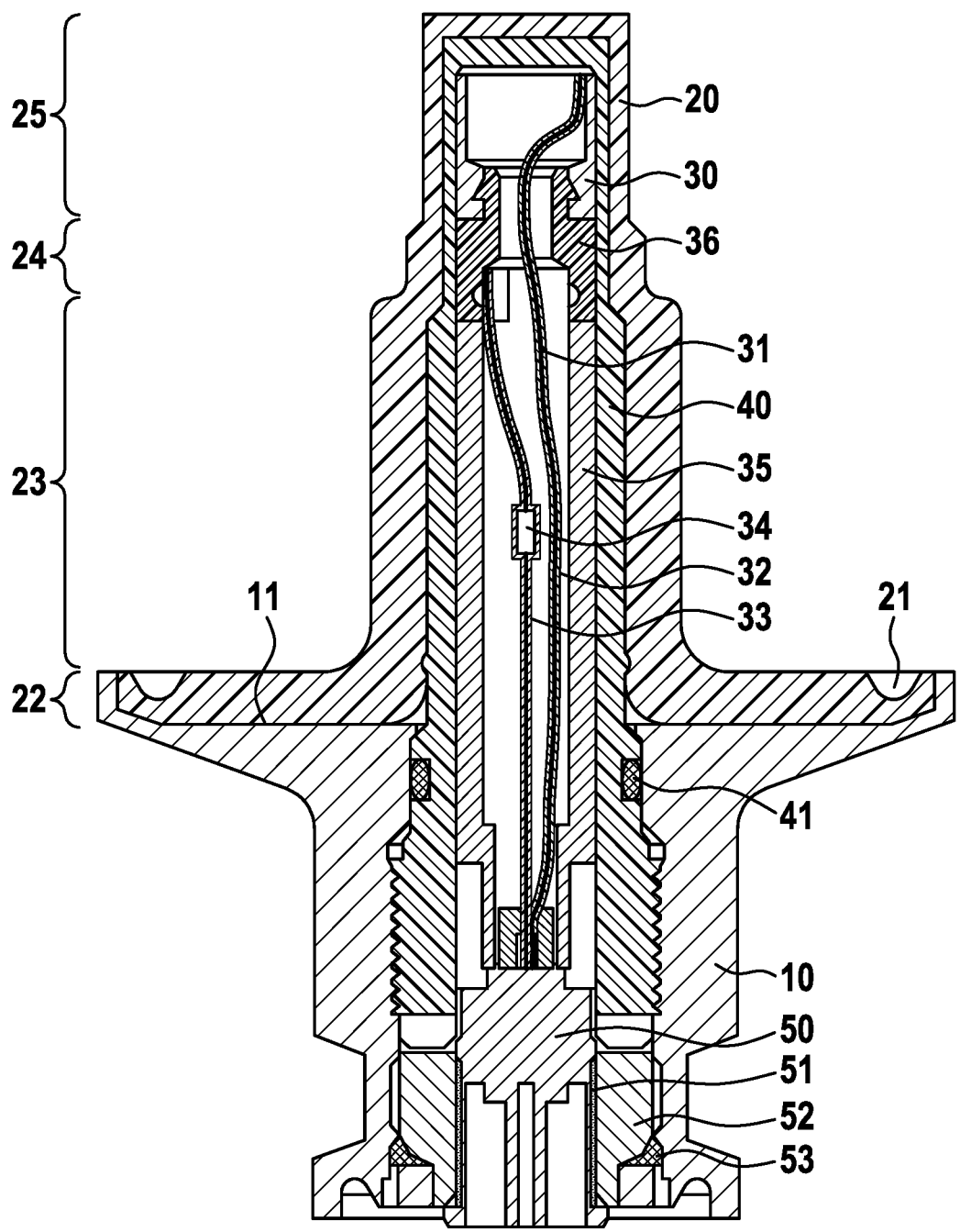
FIG. 1 shows a longitudinal sectional depiction of a sensor according to an exemplary embodiment of the invention, without its metal clamp connection.
Figure 2:
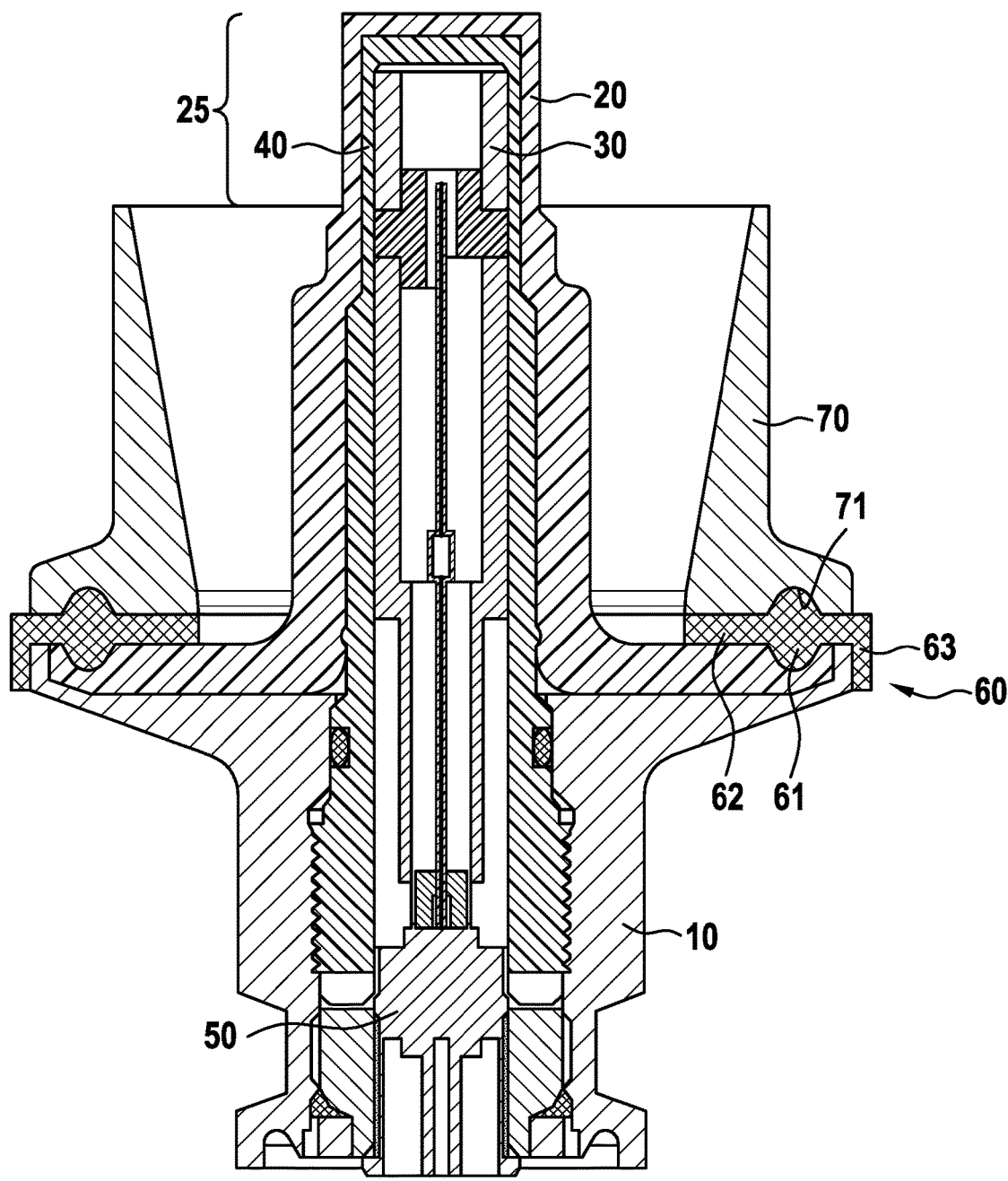
FIG. 2 shows a longitudinal sectional depiction of a sensor according to an exemplary embodiment of the invention, without its fastening clamp.

FIG. 1 shows a sensor according to an exemplary embodiment of the invention, together with parts of its sensor housing. It has a housing 10, which presently consists of high-grade steel. There is a recess 11 in an end face of the housing 10, said recess running annularly around a cavity running along the longitudinal axis of the housing 10. A media contacting cap 20 is arranged partially in this recess 11. On its side facing away from the housing 10, it has a recess 21 running in a circle on this side. The media contacting cap 20 comprises four sections 22 to 25. These are formed integrally with one another and presently consist of PTFE. The first section 22 substantially has the shape of a disc, which is pierced through annularly in its middle. It is arranged fully in the recess 11 of the base body 10. The recess 21 of the media contacting cap 20 is located in this first section 22. The second section 23 is hollow-cylindrical and has an inner diameter which corresponds to the inner diameter of the opening in the first section 22. The third section 24 has both a smaller inner diameter and a smaller outer diameter than the second section. The fourth section has the same inner diameter as the third section yet an even smaller outer diameter. It is closed on its end face.

A measuring element 30 in the form of a tinned electrode, which consists of a copper-zinc alloy, is arranged in the fourth section 25. It has a silvered copper wire 31 for the signal transfer, said copper wire being guided in a first tube 32 made of PTFE. A second tube 33, which is designed as shrink tubing, surrounds a further wire. Furthermore, a resistor 34 is arranged in this tube 33. The two tubes 32, 33 are surrounded by a tinned shielding electrode 35, which consists of a copper-zinc alloy, over a majority of their length. An insulating body 36 made of PTFE separates the measuring element 30 from the shielding electrode 35. All these components 30 to 36 are surrounded together by an insulation cap 40 made of PEEK. This extends across the entire length of the media contacting cap 20 and across a part of the length of the housing 10. It is sealed both hygienically with a sharp-edged housing opening and redundantly inside the housing 10 by a seal 41 running around it made of EPDM. It is closed by a triaxial plug 50, which is electrically conductively fixed to a pipe closure 52 by means of an adhesive 51. This is sealed in relation to the housing by means of a seal made of EPDM.

The sensor is designed as a capacitive sensor for the fill level measuring. In order to be able to arrange it on a container, a sealing element 60, which presently consists of EPDM, is arranged on the first section 21 of the media contacting cap 20 in such a way that it engages into the recess 21 of the media contacting cap 20 with an engagement region 61 running around said media contacting cap. The engagement region 61 is here located in an annular region 62 of the sealing element 60, which abuts on the media contacting cap 20. A lip 63 is angled by 90° in relation to this region 62 and surrounds the region of the housing 10 in which its recess 11 is located. A welding flange 70 made of high-grade steel, which has a recess 71, which runs annularly on its end face, is placed with the end face onto the sealing element 60 in such a way that the engagement region 61 engages into the recess 71 of the welding flange 70. The length of the welding flange 70 is chosen in such a way that the second section 23 and the third section 24 of the media contacting cap 20 are located inside the welding flange 70, while the fourth section 25 is located outside the welding flange 70. This leads to the measuring element 30 also being positioned outside the welding flange 70 and thus not being surrounded by metal.

Figure 3:
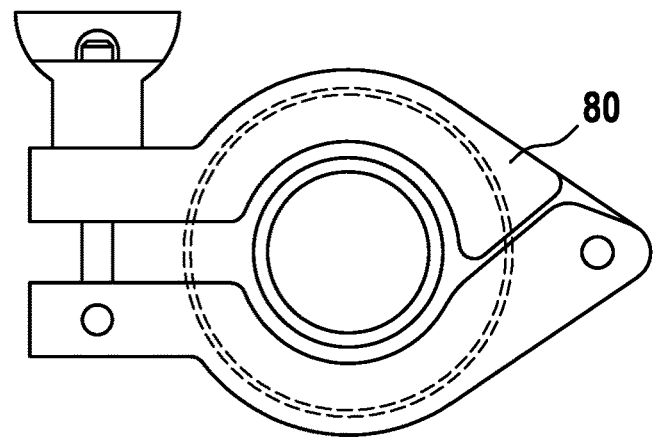
FIG. 3 shows a top view of a fastening clamp of a sensor according to an exemplary embodiment of the invention.
Figure 4:
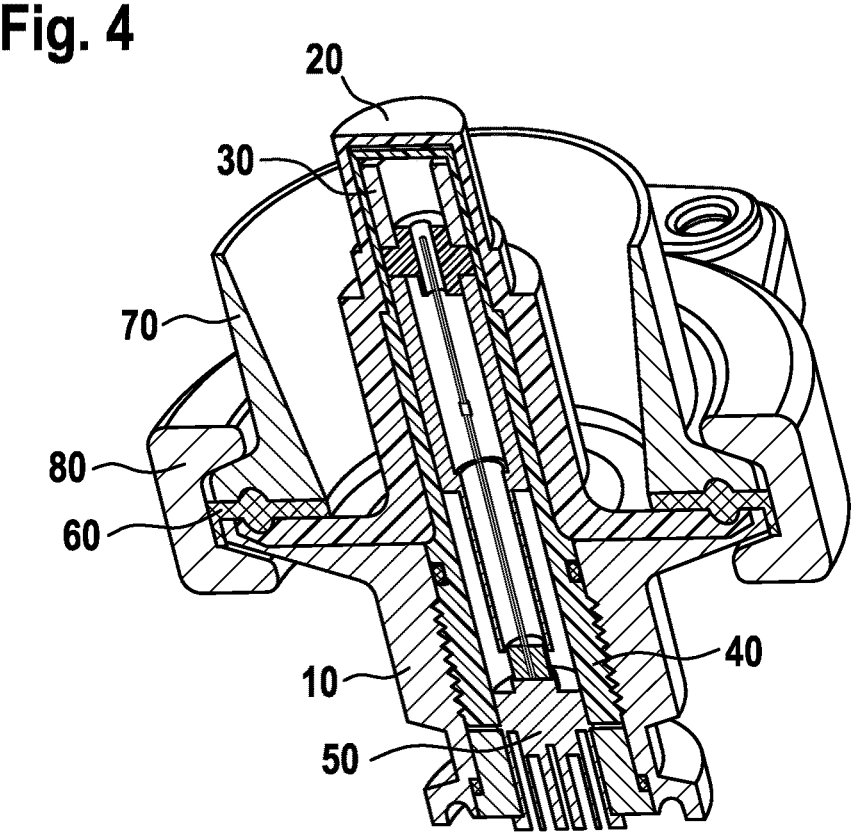
FIG. 4 shows an isometric longitudinal sectional depiction of a sensor according to an exemplary embodiment of the invention.

FIG. 3 shows a fastening clamp 80, which is provided for a Triclamp® metal clamp connection. As is depicted in FIG. 4, the housing 10, the media contacting cap 20 and the welding flange 70 can be fixedly clamped to one another by means of this fastening clamp. Here, a sealing between the media contacting cap 20 and the welding flange 70 takes place as a result of the sealing element 60. The effective sealing surface of the sealing element 60 is designed to be slightly conical in the entire periphery in order to achieve a hygienic sealing by means of higher compressive forces on the media side. The lip 63 of the sealing element 60 comes to rest on the peripheral surface of the housing 10 and thus prevents the fastening clamp 80 from pressing directly onto the housing 10 and simultaneously secures the position of the sealing element 60 in relation to the housing 10.

Figure 5:
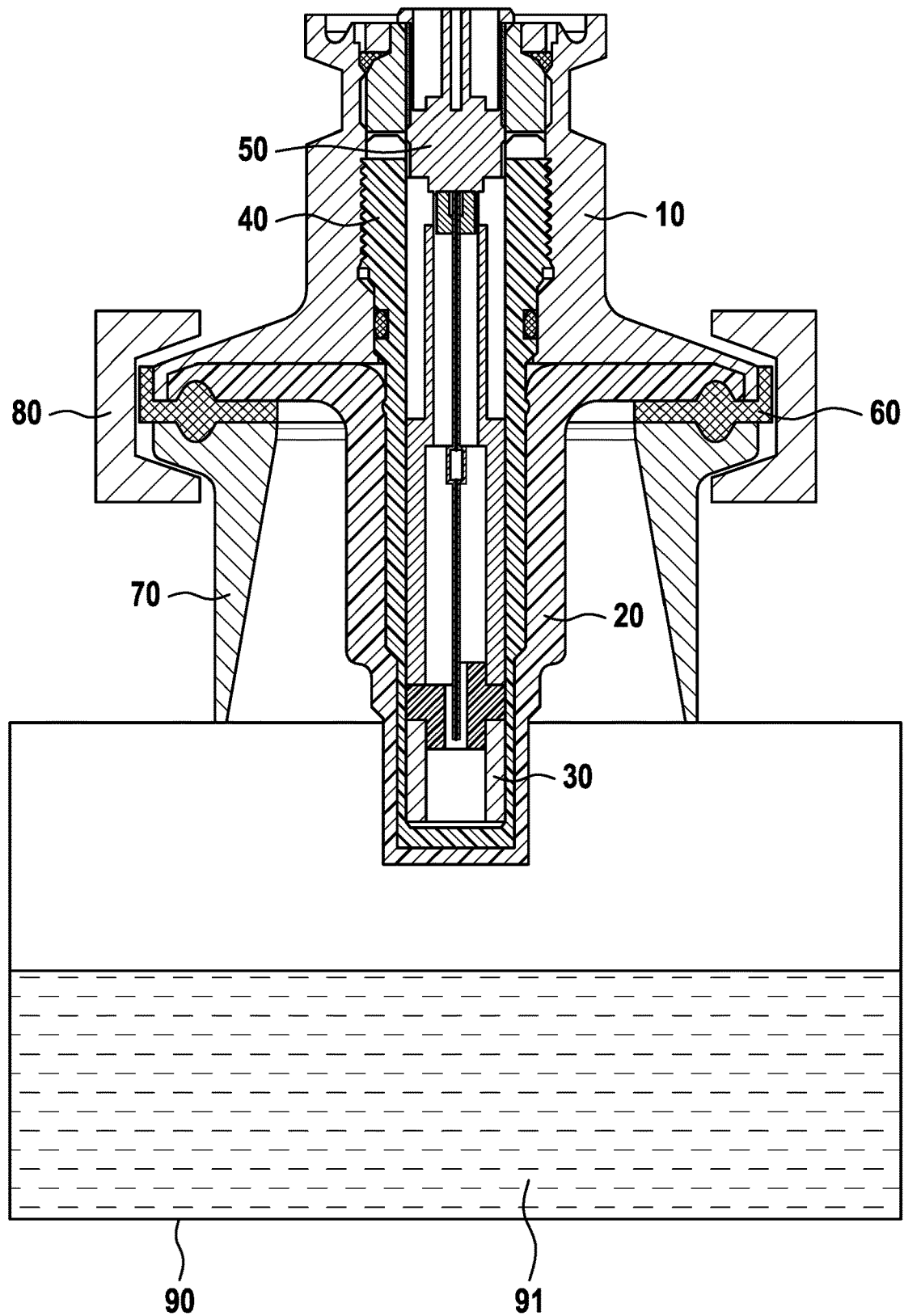
FIG. 5 shows the arrangement of a sensor in a longitudinal sectional depiction according to an exemplary embodiment of the invention on a container.

In order to use the sensor for measuring the fill level, the welding flange 70 is welded onto an opening of a container 90 in the manner depicted in FIG. 5. The fill level of a liquid 91, which is stockpiled in the container 90, can then be capacitively measured by means of the measuring element 30. Here, this is spaced apart from all the metal components to such an extent that these do not impair the function of the measuring element 30. Only the media contacting cap 20 and the welding flange 70 can come into contact with the liquid 91. There are no gaps through which the liquid 91 could creep into the inside of the media contacting cap 20 or into the inside of the housing 10. This is prevented by the sealing element 60.

The fastening clamp 80 is removed for the purpose of cleaning and disinfecting. Then, firstly the housing 10 with the components 30 to 36, 40 to 41 and 50 to 53 arranged therein can be taken out of the media contacting cap 20. Here, the measuring element 30 remains protected by the insulating cap 40. Since this does not come into contact with the media, it does not have to be cleaned. The media contacting cap 20 and the sealing element 60 are removed from the welding flange 70 and can be cleaned by autoclaving. The media contacting cap 20 is then used again; the sealing element 60 can be replaced as needed. In order to prevent an interruption of the process when cleaning and disinfecting, a different sealing element 60 and a different media contacting cap 20 can immediately be placed on the welding flange 70 and the remaining components of the sensor can be reintroduced into the media contacting cap 20. After closing the fastening clamp 80, the sensor is then immediately ready to be used again.

The invention claimed is:

1. Sensor housing, comprising:
a base body; and
a media contacting cap;
wherein the media contacting cap is arranged partially in a first recess of the base body in a detachable manner;
further wherein the media contacting cap has a second recess running annularly for partially receiving a sealing element for a metal clamp connection;
further wherein the media contacting cap has a discoid section and at least one hollow-cylindrical section, wherein the discoid section is arranged in the first recess of the base body, and the second recess is arranged in the discoid section.

2. The sensor housing of claim 1, further wherein the base body is a metal or a metal alloy, and the media contacting cap is at least one plastic.

3. The sensor housing of claim 1, further comprising a sealing element, which engages into the second recess of the media contacting cap with an engagement region.

4. The sensor housing of claim 3, further comprising a welding flange, wherein the engagement region of the sealing element engages into a third recess of the welding flange.

5. The sensor housing of claim 4, further comprising a fastening clamp, which fixedly clamps the housing, the sealing element and the welding flange to one another.

6. The sensor housing of claim 5, further wherein the sealing element extends between the housing and the fastening clamp.

7. The sensor housing of claim 1, further comprising a sensor having a measuring element, wherein the sensor is arranged in the media contacting cap of the sensor housing.

8. The sensor housing of claim 7, further wherein the measuring element is a capacitive measuring element.

9. The sensor housing of claim 7, further wherein the sensor element is arranged in a section of the media contacting cap, which extends along the longitudinal axis of the sensor beyond a welding flange.

10. The sensor housing of claim 7, further wherein the measuring element is surrounded by an insulation cap, which extends into the base body.

* * * * *